Aug. 18, 1925.

A. J. GRINDLE 1,549,966

VALVE FOR POWDERED FUEL, WEIGHING DISTRIBUTING SYSTEM

Filed Feb. 1, 1923    3 Sheets-Sheet 2

Inventor:
Aubrey J. Grindle
By Cheever & Cox
Attys

Aug. 18, 1925. 1,549,966
A. J. GRINDLE.
VALVE FOR POWDERED FUEL, WEIGHING DISTRIBUTING SYSTEM
Filed Feb. 1, 1923   3 Sheets-Sheet 3
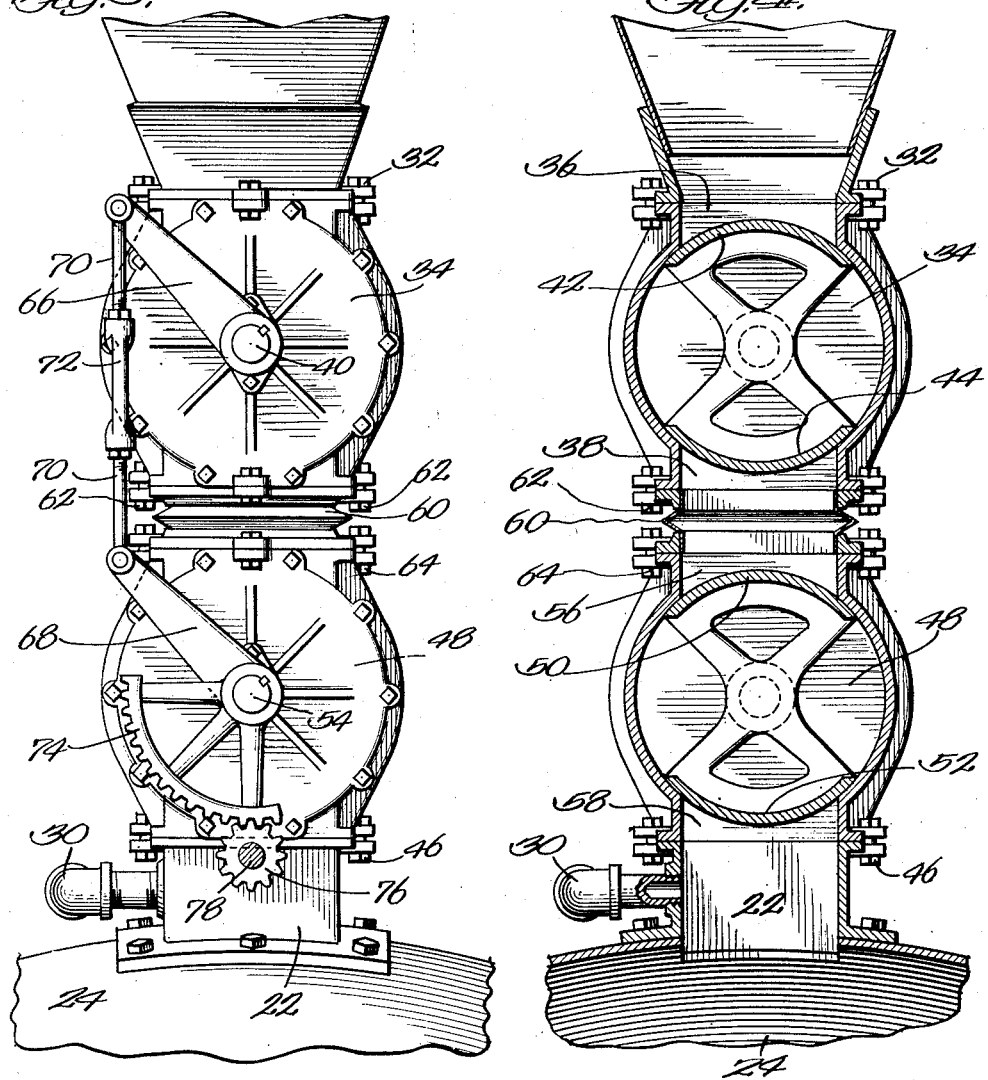
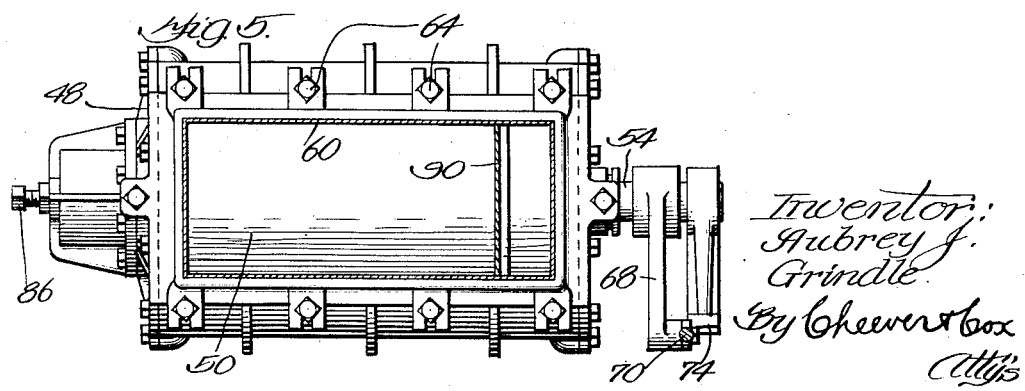
Inventor:
Aubrey J. Grindle
By Cheever & Cox
Attys Patented Aug. 18, 1925.

1,549,966

UNITED STATES PATENT OFFICE.

AUBREY J. GRINDLE, OF CHICAGO, ILLINOIS, ASSIGNOR TO GRINDLE FUEL EQUIPMENT COMPANY, OF HARVEY, ILLINOIS, A CORPORATION OF ILLINOIS.

VALVE FOR POWDERED FUEL, WEIGHING DISTRIBUTING SYSTEM.

Application filed February 1, 1923. Serial No. 616,258.

*To all whom it may concern:*

Be it known that I, AUBREY J. GRINDLE, a citizen of the United States, residing at Chicago, in the county of Cook and State of Illinois, have invented a certain new and useful Improvement in Valves for Powdered Fuel, Weighing Distributing Systems, of which the following is a specification.

This invention relates to apparatus for distributing any flowable material, a liquid or a dry powdered material, such as coal, from a stationary receptacle or tank via a second receptacle, usually a closed tank, mounted on scales and therefore reciprocatable to and from the first tank, said second tank being before or during the weighing operation under air or similar pressure for the purpose of distributing the material from said secondary tank to one or more outside points.

The concrete embodiment-of devices to which the invention is applicable is shown, described and claimed in my earlier application No. 440,007, filed January 26, 1921.

In mechanism of the class described, the nature of the material distributed requires that there be a valved passage between the two receptacles through which material to be distributed can, with the valve open, pass from the first to the second receptacle, preparatory to weighing the material in the second receptacle,, it being necessary to close the valve in said passageway when the distributing pressure material, such as air, is applied to the second or lower receptacle to drive out and distribute the weighing material. Because of the necessary reciprocatory movement of the second or scale mounted receptacle toward the first receptacle, it is necessary to provide an extension device, such for instance as a bellows, in the valve passageway between the two receptacles. When only a single valve is used in this extensible passageway between the two receptacles, accurate weighing of the material in the second receptacle is impossible, for with only one valve, material left in the first receptacle and not passed to the second necessarily engages and bears upon the valve when in closed position with the result that if the flexible bellows part of the passage is between the stationary receptacle and the valve, this material will force the valve and consequently the lower receptacle downward by an amount corresponding to such material in the upper receptacle bearing on the valve and thus erroneously add the weight of this material above the valve to the weight of the lower receptacle and its contents, thus distorting the supposed weight of the material in the lower receptacle shown by the scales, and, conversely, if the bellows or other flexible mechanism is applied between the valve and the lower receptacle, the valve being rigid on the upper receptacle, and the air pressure applied in the lower receptacle for driving out material during the weighing operation, it will engage the valve and force the lower receptacle down as far as the bellows will permit, thereby causing the scales on which the lower receptacle is mounted to show an apparent additional weight equal to this pressure in the receptacle multiplied by the area of the valve engaged by that pressure.

The object of this invention is to provide a valve mechanism for use at the point indicated which largely removes these errors, which can be comparatively easily and cheaply made, which is satisfactory in use and is not readily liable to get out of order.

The invention consists in means for attaining the foregoing objects,—specifically in the use of two independent valves, one rigid with the stationary receptacle, one rigid with the moving receptacle, the flexible connection between the two receptacles being between these two valves with the result that material in the upper receptacle can never in any manner force the movable receptacle down, and the internal pressure in the movable receptacle can not cause any movement of the movable receptacle with reference to the fixed receptacle.

The invention further consists in means for simultaneously operating the two valves from a single point, for adjusting the two valves to allow for variations in distance of travel of the movable receptacle toward the stationary receptacle, and in other features and details of construction which will be hereafter more fully set forth in the specification and claims.

Referring to the drawings in which like numerals designate the same parts throughout the several views:

Figure 3 is a side view of the mechanism of Figure 2 taken from the right hand side of that figure.

Figure 4 is a central, sectional view of the valves taken on the line 4—4 of Figure 2.

Figure 5 is a plan view on the line 5—5 of Figure 2.

Figure 1:
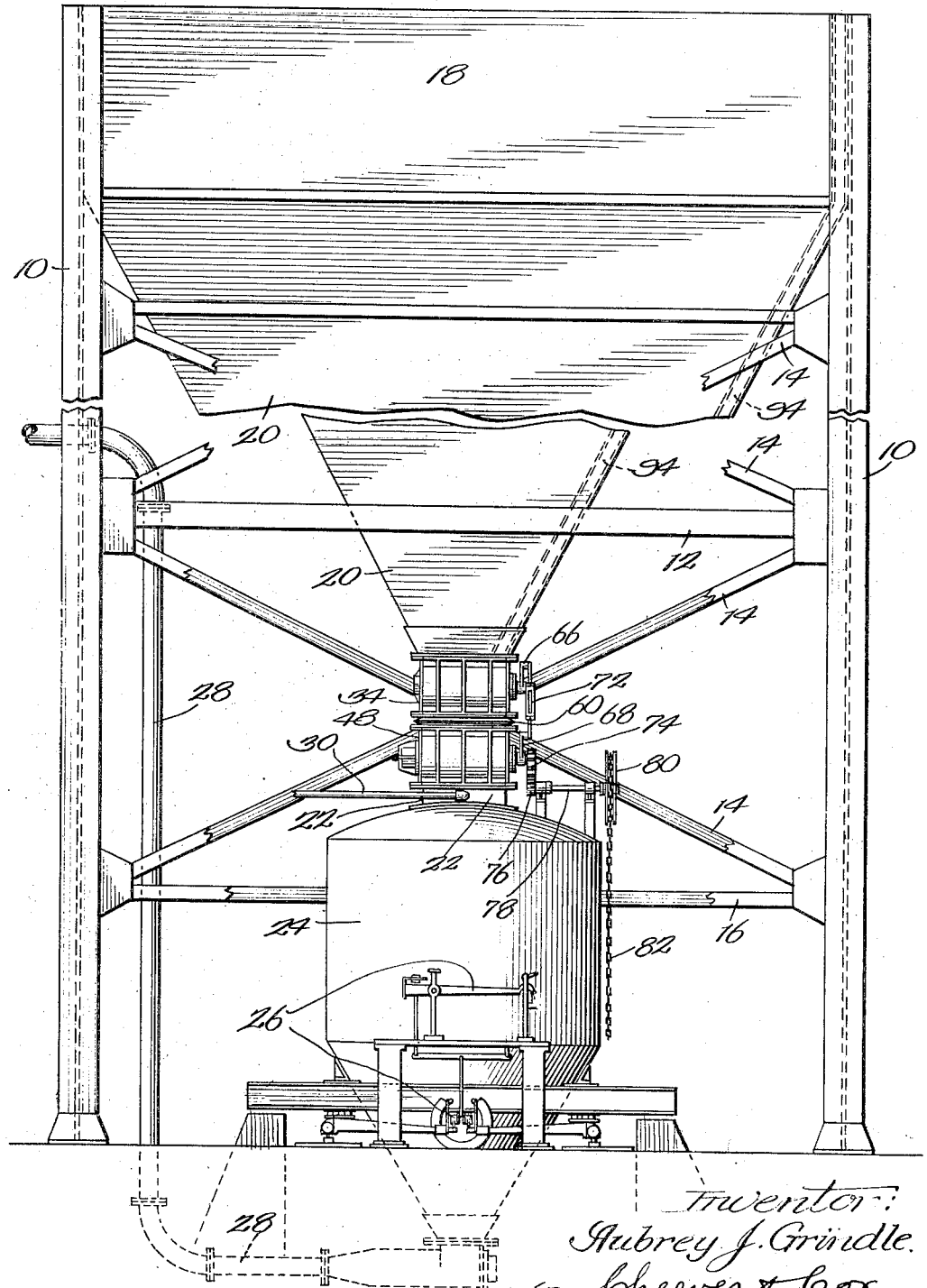
Figure 1 is a side elevation of a powdered fuel distributing plant having the mechanism of this invention applied thereto, the non-essential central portion of the upper or stationary tank being cut away.

A conventional form of central station frame work 10—12—14—16 is shown in Figure 1 rigidly sustaining an upper material tank 18, having a downwardly tapered hopper 20 leading to and in alignment with the intake port 22 of a weighing tank 24, conventionally mounted on scales 26 in reciprocatable relation with the first tank 18, this tank 24 being provided at its bottom with a discharge pipe mechanism 28 through which material delivered from tank 18 and weighed while in tank 24 may be forced out under pressure of air or the like entering tank 24 through pipe 30 from any suitable external source of power not shown.

In carrying out the invention heretofore outlined, the lower end of hopper 20 has rigidly secured to it by any suitable means as, for instance, bolts 32, a valve casing 34 having an upper port 36 registering with the hopper 20, and an oppositely disposed lower port 38, there being suitably journaled in this casing at one end, by means of a shaft 40, a cylindrical valve member having oppositely disposed valve segments 42 and 44 adapted when the parts are in the position shown in Figure 4 to close ports 36 and 38 and adapted to leave said ports open when the valve is rotated through 90° from that position.

Similarly, the upper end of intake port 22 of tank 24 has secured to it by any suitable means as, for instance, bolts 46, a valve casing 48 containing a rotatable valve member 50—52 mounted at one end on a shaft 54, said valve selectively closing in obvious manner an upper port 56, separated from but registering with the port 38 and a port 58 directly entering the passage 22.

These two valve casings 34 and 48 are separated sufficiently so that material tank 24 can reciprocate vertically to whatever extent is required by the normal movement of scales 26 on which said tank 24 is mounted. The intervening space between these two valve casings is occupied by a flexible, specifically a bellows, pipe 60, detachably connected to the casing 34 about port 38 by any suitable means as, for instance, the bolts 62, and correspondingly connected to casing 48 about the port 56 by any suitable means as, for instance, bolts 64. This pipe 60 is of sufficient length and of sufficient flexibility so that the second tank 24 may, as before, move as much as is required by the normal action of the scales 26.

The arcs of the valve segments 42—44, 50 and 52 are, as clearly shown in Figure 4, greater than the widths of the ports 36—38, 56 and 58, so that as tank 24 reciprocates with the valves in closed position, one or both of the valves can—as the bellows 60 collapses or expands—rock across the adjacent ports without opening said ports.

Shafts 40 and 54 carry parallel crank arms 66 and 68 conventionally attached together by a connecting rod 70, preferably but not necessarily containing an adjustable extension device such, for instance, as one or more turn-buckles 72, by means of which the operator can lengthen the rod 70 to allow the variation in distance between the valve cases 34 and 48 in original construction of the device, or to angularly vary the relationship of the valve mechanisms 42—44 and 50—52 to insure simultaneous complete closing or simultaneous complete opening of the two valve devices.

While there is nothing in the broad principle of the invention to prevent the entire omission of the rod 70 and an operator's then independently manipulating crank arms 66 and 68 to separately set the valve mechanisms, it is desirable, for convenience, to adjustably join these connecting rods as described and to provide a single operating means by which the user may manipulate both valves in unison. A specific mechanism for accomplishing this result is provided by equipping shaft 54 with a segmental gear 74, meshing with a pinion 76 on a shaft 78, carrying a pulley 80 over which travels a conventional form of pull chain or rope 82, manipulatable by distantly located workmen standing, for instance, near the bottom of tank 24, adjacent to the scales 26.

Figure 2:
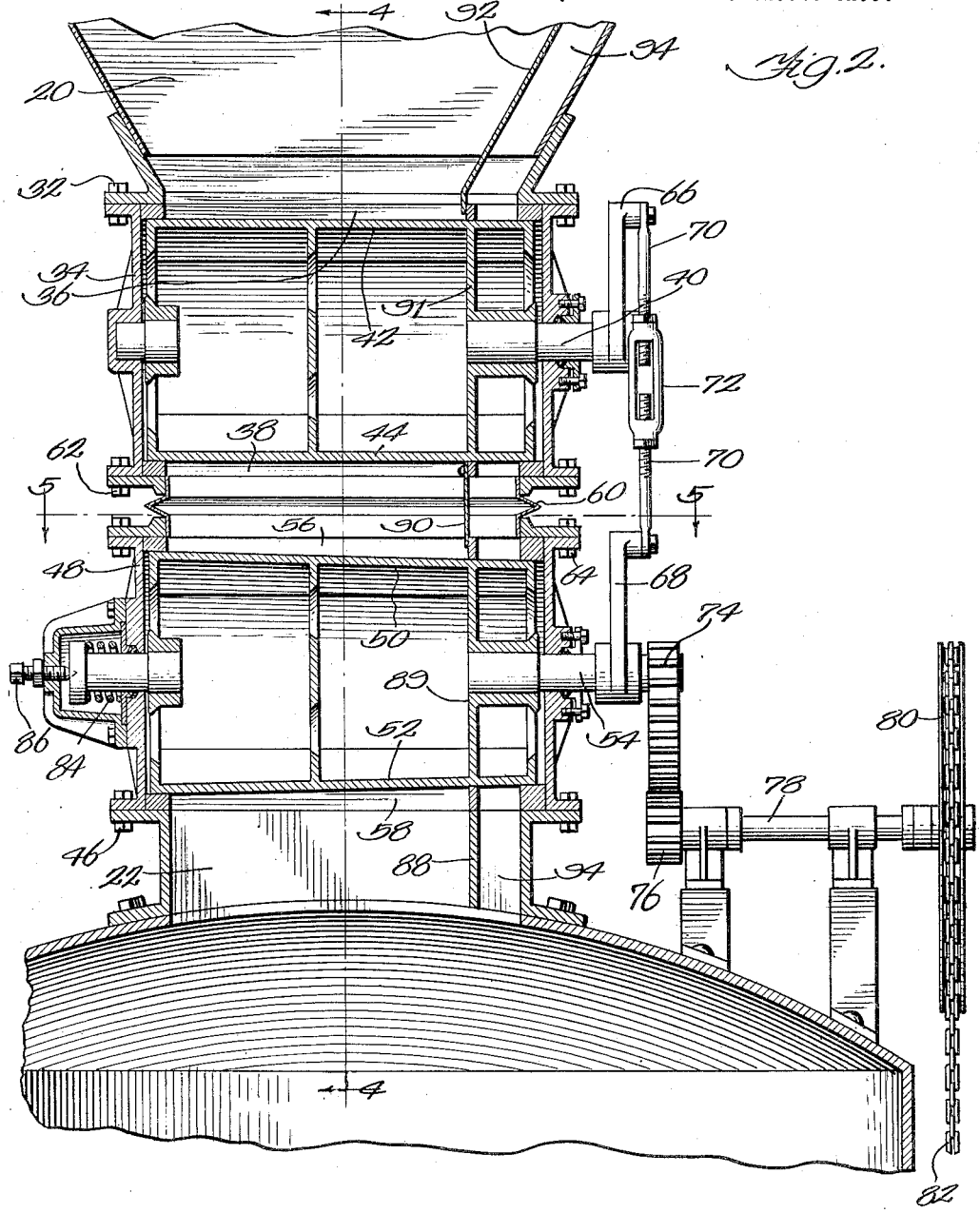
Figure 2 is an enlarged, central, sectional side view of the valve mechanism of this invention, taken from the center of Figure 1.

The valve 36 is cylindrical in form, while the valve 50—52, is tapered as shown in Figure 2 and forced endwise by a spring mechanism 84 adjusted by a set screw 86, not entering specifically into the broad invention.

When tank 24 is void of flowable material, and is to be filled by material from tank 20 passing through the two valves described, the air which necessarily occupies tank 24 has to go somewhere and a convenient exit passage for such air is provided by means of registering partitions 88—89—90—91 and 92, mounted as is shown in obvious manner, forming—when the valves are open—an open passageway 94 leading from the tank 24 to the upper open end of the upper tank 18. These partition members 89 and 91, through the valves, do not in any way affect the operative action of segmental members 42—44 and 50—52, in closing off passageway between the tanks when the valves are in closed position; in other words, passageway 94 is just as effectively closed when the valves are in closed position as is the flowable material passageway leading from the upper to the lower tank.

In the operation of the device, the operator simply manipulates chain 82 to in obvious manner set the valves to open position to admit material from the upper tank to the lower one, the air in the lower tank simultaneously discharging through passage 94. When the lower tank is full, the operator further manipulates the chain 82 to close both valves thereby shutting off the flow of material from the upper tank to the lower and preventing the escape of air from the lower tank either through the main passageway or the supplemental passageway 94. Under the last named condition, the operator can turn on air or the like through pipe 30 to force material from the lower tank during any stage of the weighing operation and the air pressure will not in any way affect the accuracy of the weight obtained on the scales 26. As material is forced out of the lower tank 24 by the pressure delivered through pipe 30, the flexible connections, specifically bellows 60, allow free movement of the lower tank without injury to either valve.

The valve segments 42 and 44 are really duplicates of each other, one being added merely to reinforce the other and insure complete closure of the passage through the valve case which it controls, also to balance the opposite segment. So far as the broad principle of the invention is concerned, either one may be omitted without departing from the invention. The same relationship exists between valve segments 50 and 52.

Having thus described my invention, what I claim as new and desire to secure by Letters Patent is:

-1. In mechanism of the class described, in combination, two adjacent, separated receptacles, one movable with reference to the other, having oppositely disposed ports, a valve reciprocable across the port of each receptacle, an extensible passage between the valves connecting the receptacles, and single means for simultaneously operating both valves, the effective length of each valve being sufficiently greater than the port it covers to allow for reciprocation of the movable receptacle without opening either valve when it is supposed to be closed.

2. In mechanism of the class described, in combination, two adjacent, separated receptacles, one movable with reference to the other, having oppositely disposed ports, a valve reciprocable across the port of each receptacle, an extensible passage between the valves connecting the receptacles, means supplying material to be delivered through the valves to the movable receptacle, scales supporting the movable receptacle, means supplying motive fluid under pressure to the movable receptacle, and single means for simultaneously operating both valves, the effective length of each valve being sufficiently greater than the port it covers to allow for reciprocation of the movable receptacle without opening either valve when it is supposed to be closed.

3. In mechanism of the class described, in combination, two adjacent, separated receptacles, one movable with reference to the other, having oppositely disposed ports, a valve reciprocable across the port of each receptacle, an extensible passage between the valves connecting the receptacles, single means for simultaneously operating both valves, and means in the operating means allowing for differences in initial distance between the receptacles, the effective length of each valve being sufficiently greater than the port it covers to allow for reciprocation of the movable receptacle without opening either valve when it is supposed to be closed.

4. In mechanism of the class described, in combination, two adjacent, separated receptacles, one movable with reference to the other, having oppositely disposed ports, a valve reciprocable across the port of each receptacle, an extensible passage between the valves connecting the receptacles, means supplying material to be delivered through the valves to the movable receptacle, scales supporting the movable receptacle, means supplying motive fluid under pressure to the movable receptacle, single means for simultaneously operating both valves, and means in the operating means allowing for differences in initial distance between the receptacles, the effective length of each valve being sufficiently greater than the port it covers to allow for reciprocation of the movable receptacle without opening either valve when it is supposed to be closed.

5. In mechanism of the class described, in combination, two adjacent, separated receptacles, one movable with reference to the other, having oppositely disposed ports, a rotatable valve segment rockable across the port of each receptacle, an extensible passage between the valves connecting the receptacles, and single means for simultaneously operating both valves, the arc of each valve segment being sufficiently wider than the port it covers to allow for reciprocation of the movable receptacle without opening either valve when it is supposed to be closed.

6. In mechanism of the class described, in combination, two adjacent, separated receptacles, one movable with reference to the other, having oppositely disposed ports, a rotatable valve segment rockable across the port of each receptacle, an extensible passage between the valves connecting the receptacles, means supplying material to be delivered through the valves to the movable receptacle, scales supporting the movable receptacle, means supplying motive fluid under pressure to the movable receptacle, and single means for simultaneously operating both valves, the arc of each valve segment being sufficiently wider than the port it covers to allow for reciprocation of the movable receptacle without opening either valve when it is supposed to be closed.

7. In mechanism of the class described, in combination, two adjacent, separated receptacles, one movable with reference to the other, having oppositely disposed ports, a rotatable valve segment rockable across the port of each receptacle, an extensible passage between the valves connecting the receptacles, single means for simultaneously operating both valves, and means in the operating means allowing for differences in initial distance between the receptacles, the arc of each valve segment being sufficiently wider than the port it covers to allow for reciprocation of the movable receptacle without opening either valve when it is supposed to be closed.

8. In mechanism of the class described, in combination, two adjacent, separated receptacles, one movable with reference to the other, having oppositely disposed ports, a rotatable valve segment rockable across the port of each receptacle, an extensible passage between the valves connecting the receptacles, means supplying material to be delivered through the valves to the movable receptacle, scales supporting the movable receptacle, means supplying motive fluid under pressure to the movable receptacle, single means for simultaneously operating both valves, and means in the operating means allowing for differences in initial distance between the receptacles, the arc of each valve segment being sufficiently wider than the port it covers to allow for reciprocation of the movable receptacle without opening either valve when it is supposed to be closed.

9. In mechanism of the class described, in combination, two adjacent, separated receptacles, one movable with reference to the other, having oppositely disposed ports, a valve for the port of each receptacle, and an extensible passage between the valves connecting the receptacles, there being also an air escape passage leading from the movable receptacle through said valve devices and the other receptacle controlled by said valves in unison with their control of the main passage between the receptacles.

10. In mechanism of the class described, in combination, two adjacent, separated receptacles, one movable with reference to the other, having oppositely disposed ports, a valve for the port of each receptacle, an extensible passage between the valves connecting the receptacles, and single means for simultaneously operating both valves, there being also an air escape passage leading from the movable receptacle through said valve devices and the other receptacle controlled by said valves in unison with their control of the main passage between the receptacles.

11. In mechanism of the class described, in combination, two adjacent, separated receptacles, one movable with reference to the other, having oppositely disposed ports, a valve for the port of each receptacle, an extensible passage between the valves connecting the receptacles, single means for simultaneously operating both valves, and means in the operating means allowing for differences in initial distance between the receptacles, there being also an air escape passage leading from the movable receptacle through said valve devices and the other receptacle controlled by said valves in unison with their control of the main passage between the receptacles.

In witness whereof, I have hereunto subscribed my name.

AUBREY J. GRINDLE.